United States Patent
Shin

(10) Patent No.: US 9,806,492 B2
(45) Date of Patent: Oct. 31, 2017

(54) OPTICAL AMPLIFIER USING OPTICAL FIBER

(71) Applicant: GWANGJU INSTITUTE OF SCIENCE AND TECHNOLOGY, Gwangju (KR)

(72) Inventor: Woo Jin Shin, Gwangju (KR)

(73) Assignee: GWANGJU INSTITUTE OF SCIENCE AND TECHNOLOGY, GWANGJU (KR)

( * ) Notice: Subject to any disclaimer, the term of this patent is extended or adjusted under 35 U.S.C. 154(b) by 0 days.

(21) Appl. No.: 14/892,573

(22) PCT Filed: May 30, 2014

(86) PCT No.: PCT/KR2014/004868
§ 371 (c)(1),
(2) Date: Nov. 19, 2015

(87) PCT Pub. No.: WO2014/193197
PCT Pub. Date: Dec. 4, 2014

(65) Prior Publication Data
US 2016/0099542 A1   Apr. 7, 2016

(30) Foreign Application Priority Data

May 31, 2013  (KR) .................. 10-2013-0062753
Sep. 4, 2013  (KR) .................. 10-2013-0106034

(51) Int. Cl.
*H01S 3/067*  (2006.01)
*H01S 3/094*  (2006.01)
(Continued)

(52) U.S. Cl.
CPC .......... *H01S 3/1616* (2013.01); *H01S 3/0675* (2013.01); *H01S 3/06754* (2013.01);
(Continued)

(58) Field of Classification Search
CPC .... H01S 3/1608; H01S 3/1616; H01S 3/0675; H01S 3/06754; H01S 3/06762
See application file for complete search history.

(56) References Cited

U.S. PATENT DOCUMENTS 7,738,166 B2 *  6/2010  Murison ............. H01S 3/06754
                                                          359/341.3
2003/0156818 A1 *  8/2003  Anderson ................. C03C 3/06
                                                          385/142

(Continued)

FOREIGN PATENT DOCUMENTS

JP       2005520326 A    7/2005
KR   1020000027961 A    5/2000
(Continued)

OTHER PUBLICATIONS

International Search Report for PCT/KR2014/004868 dated Sep. 5, 2014.

*Primary Examiner* — Eric Bolda
(74) *Attorney, Agent, or Firm* — Hauptman Ham, LLP

(57) ABSTRACT

The present disclosure provides an optical amplifier using an optical fiber. The optical fiber includes a single-mode optical fiber in which a plurality of rare earth elements is doped simultaneously; first and second optical fiber gratings disposed at opposite sides of the optical fiber, respectively, and totally reflecting light having a wavelength in a specific range; a pumping light source configured to generate a pumping light to excite rare earth ions in the optical fiber; and an optical coupler connected to the optical fiber and configured to transmit a light signal generated from a light source and the pumping light generated from the pumping light source to the optical fiber. Therefore, it is possible to obtain efficient amplification of a light signal through a simple configuration using the rare earth elements-doped optical fiber.

4 Claims, 5 Drawing Sheets

(51) Int. Cl.
*H01S 3/16* (2006.01)
*H01S 3/07* (2006.01)
*H01S 3/00* (2006.01)

(52) U.S. Cl.
CPC ...... *H01S 3/06762* (2013.01); *H01S 3/06783* (2013.01); *H01S 3/094003* (2013.01); *H01S 3/094015* (2013.01); *H01S 3/094053* (2013.01); *H01S 3/1608* (2013.01); *H01S 3/0064* (2013.01); *H01S 3/07* (2013.01); *H01S 3/094084* (2013.01)

(56) References Cited

U.S. PATENT DOCUMENTS

| | | | |
|---|---|---|---|
| 2005/0276564 A1* | 12/2005 | Kakui | G02B 6/02 385/141 |
| 2009/0190615 A1* | 7/2009 | Jiang | H01S 3/0675 372/6 |
| 2010/0142033 A1* | 6/2010 | Regnier | B82Y 20/00 359/341.1 |
| 2012/0147909 A1* | 6/2012 | Tsai | H01S 3/0675 372/6 |
| 2013/0101261 A1 | 4/2013 | Cadier et al. | |

FOREIGN PATENT DOCUMENTS

| | | |
|---|---|---|
| KR | 1020030050801 A | 6/2003 |
| KR | 100415804 B1 | 1/2004 |
| KR | 100987386 B1 | 10/2010 |
| KR | 1020110065305 A | 6/2011 |

* cited by examiner

OPTICAL AMPLIFIER USING OPTICAL FIBER

CROSS REFERENCE TO RELATED APPLICATION

This application claims the priority of Korean Patent Application No. 10-2013-0062753, filed on May 31, 2013 and Korean Patent Application No. 10-2013-0106034 filed on Sep. 4, 2013 in the KIPO (Korean Intellectual Property Office). Further, this application is the National Phase application of International Application No. PCT/KR2014/004868 filed on May 30, 2014, which designates the United States and was published in Korean.

TECHNICAL FIELD

The present disclosure relates to an optical amplifier using an optical fiber, and, more particularly, to an optical amplifier using an optical fiber in which a plurality of rare earth elements is doped simultaneously.

BACKGROUND ART

Recently, a laser technology having 2 μm operating wavelength has been extensively studied due to a wide range of its applicability. Among others, the study on a thulium-doped optical fiber has been extensively progressed due to the capability of generating a light signal having a wavelength around 2 μm plus the excellent optical properties that the existing optical fiber lasers have.

In case of manufacturing the optical fiber laser by using the thulium-doped optical fiber, it is required to have a multi-stage optical fiber amplifier using the thulium-doped optical fiber so as to obtain a light signal having a desired magnitude. In order to realize such a thulium-doped optical fiber amplifier, a gain medium and a pumping light source are required. Here, a pumping light source having a wavelength around 800 nm or a pumping light source having a wavelength around 1,560 nm is used to generate and amplify the light signal having the wavelength around 2 μm.

FIG. 1 is a diagram showing a conventional configuration for the amplification of the low-power light signal having a wavelength around 2 μm.

In FIG. 1, an optical amplifier is realized with respect to the input light signal having a wavelength around 2 μm by employing a thulium-doped single-mode optical fiber and an erbium-doped optical fiber.

As for a high-power amplifier, it can be realized by employing a structure of a cladding pumping optical fiber using a multi-mode type of a high-power laser diode having 800 nm operating wavelength. As for the low-power amplifier amplifying a small sized signal, it can be realized by employing a structure of a core pumping optical fiber. However, such an amplifier cannot be realized due to the absence of an optical coupler associated with the high-power laser diode having 800 nm operating wavelength.

To that end, as shown in FIG. 1, an erbium laser having 1,560 nm operating wavelength with the erbium-doped optical fiber and the thulium-doped single-mode optical fiber are employed to realize a low-power core pumping type of the optical amplifier.

However, this configuration suffers from the drawback that the erbium-doped optical fiber must be used for the pumping light source, so that the configuration thereof becomes complicated and a manufacturing cost is increased.

DISCLOSURE

Technical Problem

In order to solve the above described drawback, it is an object of the present disclosure to provide an optical amplifier using an optical fiber capable of amplifying a light signal through a simple configuration using an optical fiber in which a plurality of rare earth elements is doped simultaneously.

Technical Solution

In order to achieve the object of the present disclosure, there is provided an optical amplifier using an optical fiber, the optical fiber including: a single-mode optical fiber in which a plurality of rare earth elements is doped simultaneously; first and second optical fiber gratings disposed at opposite sides of the optical fiber, respectively, and totally reflecting light having a wavelength in a specific range; a pumping light source configured to generate a pumping light to excite rare earth ions in the optical fiber; and an optical coupler connected to the optical fiber and configured to transmit a light signal generated from a light source and the pumping light generated from the pumping light source to the optical fiber.

Further, erbium and thulium may be simultaneously doped in the optical fiber.

Further, the light signal generated from the light source may have a wavelength in a range from 1,800 nm to 2,100 nm, and a doping ratio of the erbium to the thulium may be set in a range from 1 to 2 to 1 to 10.

Further, a doping concentration of the erbium may be set to be 1,000 ppm and a doping concentration of the thulium may be set to be in a range from 2,000 ppm to 10,000 ppm.

Further, the light signal generated from the light source may have a wavelength in a range from 1,800 nm to 2,100 nm, and the light totally reflected by the first and the second optical fiber grating may have a specific wavelength in a range from 1,550 nm to 1,610 nm.

Further, the light signal generated from the light source may have a wavelength in a range from 1,800 nm to 2,100 nm, and the pumping light generated from the pumping light source may have a wavelength in a range from 970 nm to 990 nm or in a range from 1,470 nm to 1,490 nm.

Advantageous Effects

In accordance with the optical amplifier using the optical fiber of the present disclosure, it becomes possible to achieve an efficient amplification of a light signal through a simple configuration using the optical fiber doped with the plurality of the rare earth elements. Specifically, it has an advantageous effect that a light signal having a wavelength around 2 μm can be simply and effectively amplified.

BEST MODE

Figure 1:
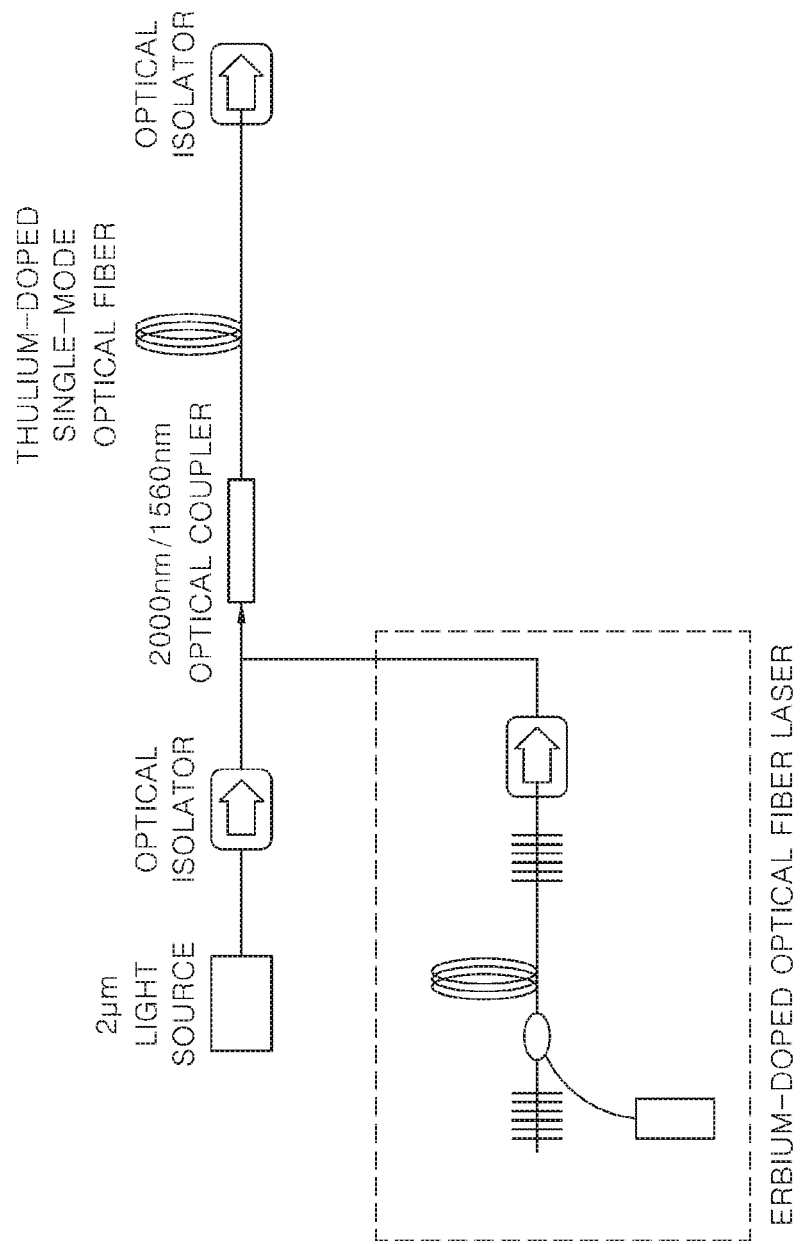
FIG. 1 is a diagram showing a conventional configuration for the amplification of a low-power light signal having a wavelength around 2 μm.

Hereinafter, exemplary embodiments of the present disclosure will be described in detail with reference to the accompanying drawings. It is to be noted that like reference numerals designate like elements throughout the drawings. In the following descriptions, the present disclosure will be described with reference to exemplary embodiments thereof. It will, however, be evident that the technical idea of the present disclosure is not limited to the exemplary embodiment but various modifications and changes may be made by those skilled in the art.

Figure 2:
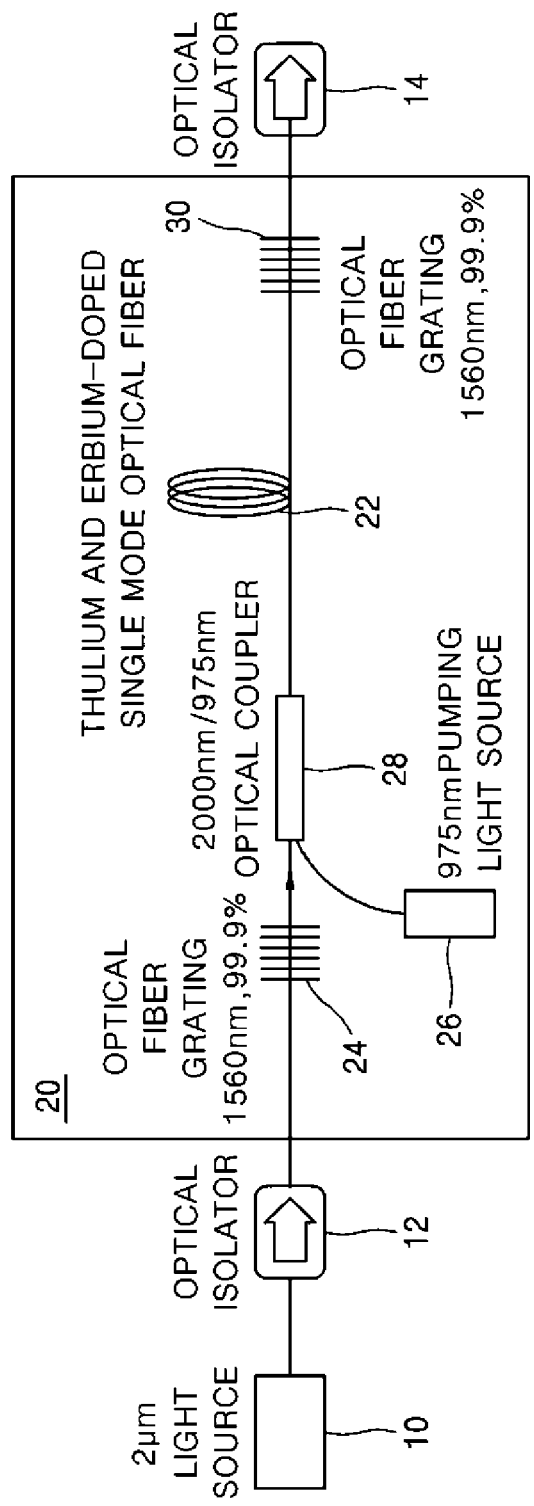
FIG. 2 is a diagram showing an optical amplifier which is realized by employing an optical fiber doped with thulium and erbium as proposed in the present disclosure.

FIG. 2 is a diagram showing an optical amplifier which is realized by employing an optical fiber doped with thulium and erbium as proposed in the present disclosure.

The optical amplifier 20 in accordance with an embodiment of the present disclosure is configured to amplify a light signal received from a light source 10 and output the amplified light signal. A first optical isolator 12 is arranged at an input terminal of the optical amplifier 20 and a second optical isolator 14 is arranged at an output terminal of the optical amplifier 20 so as to limit a light traveling direction from the light source 10 to the optical amplifier 20.

Referring to FIG. 2, the optical amplifier 20 in accordance with the embodiment of the present disclosure includes a single-mode optical fiber 22 in which the thulium and the erbium are doped simultaneously; a first optical fiber grating 24 and a second optical fiber grating 30 respectively provided at both ends of the optical fiber 22; a pumping light source 26 configured to generate a pumping light for the light amplification; and a optical coupler 28 configured to transmit the pumping light outputted from the pumping light source to the optical fiber 22.

A plurality of rare earth elements are doped simultaneously in the optical fiber 22. Various kinds of the rare earth elements can be used depending on the wavelength range of the light signal to be amplified. In the present embodiment, the optical fiber 22 in which the thulium and the erbium are doped simultaneously is used to effectively amplify the light signal having a wavelength around 2 μm.

The first and the second optical fiber grating 24 and 30 are formed of a fiber Bragg grating (Bragg's grating) and are provided at both ends of the optical fiber 22, respectively, to totally reflect light having a specific wavelength range. In the present embodiment, the first and the second optical fiber grating 24 and 30 totally reflect light having a wavelength around 1,560 nm, and the light having a wavelength around 1,560 nm resonates while the optical fiber 22 is interposed between the first and the second optical fiber grating 24 and 30.

The pumping light source 26 generates a pumping light which excites rare earth ions doped in the optical fiber 22. In the present embodiment, the pumping light source 26 generates a pumping light having a wavelength around 980 nm, and the pumping light having the wavelength around 980 nm is transmitted to the optical fiber 22 via the optical coupler 28 to activate the energy of erbium ions doped in the optical fiber 22.

The optical coupler 28 is connected to the optical fiber 22 and is configured to couple and transmit the light signal generated from the light source 10 and the pumping light outputted from the pumping light source 26 to the optical fiber 22.

The following description will explain an operation of the optical amplifier 20 having the aforementioned configuration.

At first, as shown in FIG. 2, the light signal having the wavelength around 2 μm inputted from the light source 10 is transmitted into the single-mode optical fiber 22 in which the thulium and the erbium are doped simultaneously. The traveling direction of the light signal is limited to a direction from the light source 10 to the optical amplifier 20 by the first and the second optical isolator 12 and 14.

The optical coupler 28 transmits the light signal having the wavelength around 2 μm inputted from the light source 10 and the pumping light having the wavelength around 980 nm generated from the pumping light source 26 to the optical fiber 22.

Figure 3:
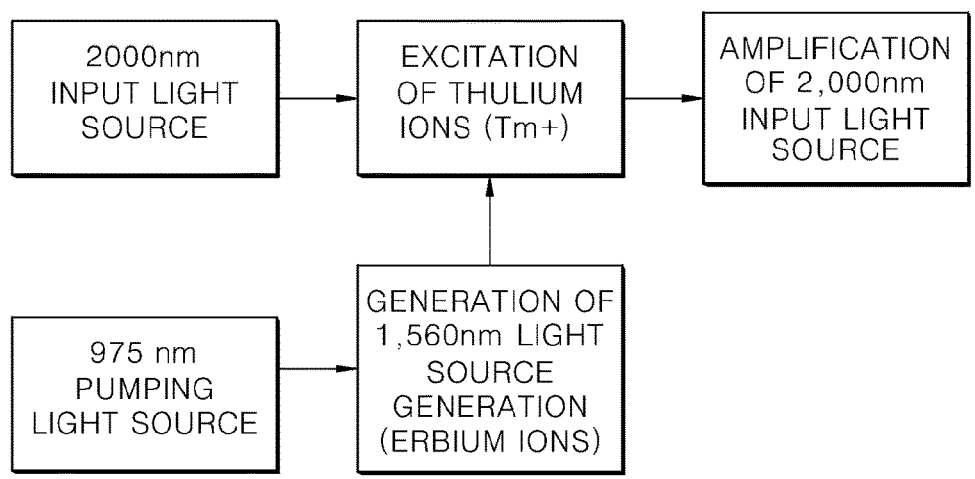
FIG. 3 is a diagram showing the principle of amplifying a light signal having a wavelength around 2 μm by using the optical fiber in which the thulium and the erbium are doped simultaneously.

FIG. 3 is a diagram showing the principle of amplifying the light signal having the wavelength around 2 μm by using the optical fiber in which the thulium and the erbium are doped simultaneously.

Referring to FIGS. 2 and 3, the pumping light having the wavelength around 980 nm transmitted into the optical fiber 22 activates the energy of the erbium ions doped in the optical fiber 22 and the light having the wavelength around 1,560 nm is generated from the excited erbium ions.

The light having the wavelength range of 1,560 nm generated from the excited erbium ions is totally reflected through the first and the second optical fiber grating 24 and 30 respectively provided at both ends of the optical fiber 22 and resonates while the optical fiber 22 is interposed between the first and the second optical fiber grating 24 and 30.

The light having the wavelength around 1,560 nm, which resonates while the optical fiber 22 is interposed between the first and the second optical fiber grating 24 and 30, excites the thulium ions doped in the optical fiber 22, and light having a wavelength around 2 μm is generated from the activated thulium ions, thereby amplifying the light signal having the wavelength around 2 μm inputted from the light source 10.

The above described configuration of the optical amplifier 20 enables a simple and efficient amplification of the light signal having the wavelength around 2 μm in comparison with the conventional case. Further, since it is possible to use an optical device having a 1,560 nm operating wavelength which is commercially available in recent years, there is an advantageous effect that a development of a cost-effective laser can be achieved.

In the present embodiment, the optical fiber 22 is doped with the erbium and the thulium simultaneously to amplify the light signal having the wavelength around 2 μm as described above. Here, a wavelength range of the light signal to be amplified can be varied depending on a doping ratio of the erbium to the thulium. The following description will explain this in more detail.

Figure 4:
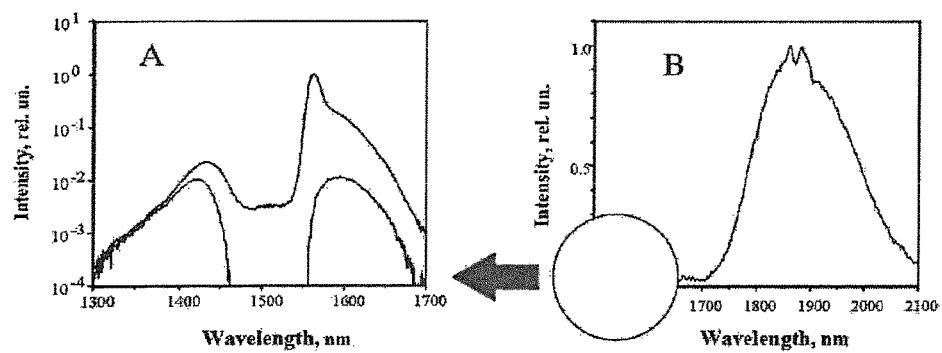
FIG. 4 is a graph showing fluorescence characteristic of the erbium-thulium simultaneous-doped optical fiber when a concentration of erbium ions is higher.

FIG. 4 is a graph showing fluorescence characteristic of the erbium-thulium simultaneous-doped optical fiber when a concentration of the erbium ions is higher.

Figure 5:
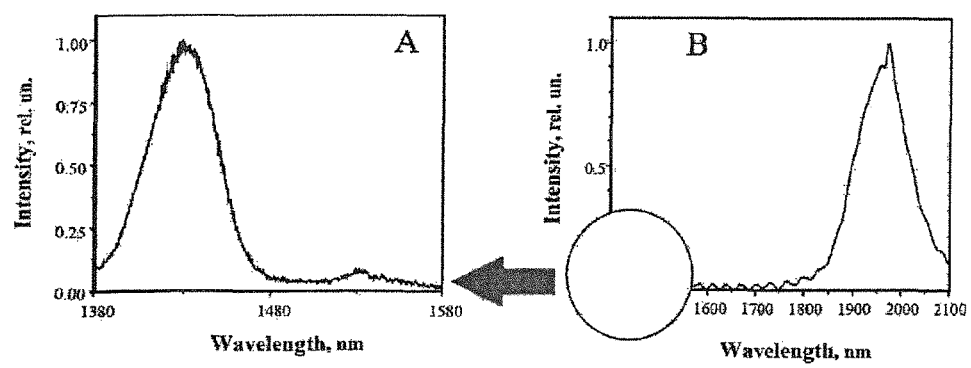
FIG. 5 is a graph showing fluorescence characteristic of the erbium-thulium simultaneous-doped optical fiber when a concentration of thulium ions is higher.

FIG. 5 is a graph showing fluorescence characteristic of the erbium-thulium simultaneous-doped optical fiber when a concentration of the thulium ions is higher.

In FIG. 4, the fluorescence characteristic of the optical fiber 22 is shown when the doping ratio of the erbium to the thulium is 1 to 1 (500 ppm:500 ppm). In FIG. 5, the fluorescence characteristic of the optical fiber 22 is shown when the doping ratio of the erbium to the thulium is 1 to 5 (1,000 ppm:5,000 ppm).

Referring to FIG. 4, in the case where the doping ratio of the erbium to the thulium is 1 to 1 (500 ppm:500 ppm) in the optical fiber 22, a fluorescence from the erbium is strong as shown in graph A and a fluorescence from the thulium appears at a wavelength around 1,800 nm as shown in graph B.

Referring to FIG. 5, when the doping ratio of the erbium to the thulium is 1 to 5 (1,000 ppm:5,000 ppm) in the optical fiber 22, a fluorescence from the erbium is relatively weak as shown in graph A and a fluorescence from the thulium is strong at a long wavelength around 2 μm as shown in graph B.

Based on the above test result, the doping ratio of the erbium to the thulium can be relatively determined depending on a wavelength of the light signal generated from the light source 10.

In the present embodiment, the optical fiber 22 in which the erbium and the thulium are doped simultaneously is used to amplify the light signal having the wavelength around 2 μm. Therefore, based on the test result shown above, the doping ratio of the erbium to the thulium is set to 1 to 5. Further, it is preferable that the doping concentrations of the erbium and the thulium are set to be 1,000 ppm and 5000 ppm, respectively. However, the scope of the present disclosure is not limited thereto, and the amplification of the light signal having the wavelength around 2 μm can be achieved as long as the doping ratio of the erbium to the thulium is set in a range from 1 to 2 to 1 to 10.

Although the light signal having the wavelength around 2 μm is amplified in the aforementioned embodiment, the scope of the present disclosure is not limited thereto and the optical amplifier 20 may be used to amplify a light signal having a wavelength in a range from 1,800 nm to 2,100 nm.

Further, in the aforementioned embodiment, the pumping light source 26 generates the pumping light having a wavelength around 980 nm (in a range from 970 nm to 990 nm) to activate the energy of the erbium ions doped in the optical fiber 22. However, the scope of the present disclosure is not limited thereto and the pumping light source 26 may generate a pumping light having a wavelength around 1,480 nm (in a range from 1,470 nm to 1,490 nm) to activate the energy of the erbium ions doped in the optical fiber 22. In this case, the pumping light having the wavelength around 1,480 nm, which is transmitted into the optical fiber 22, activates the energy of the erbium ions so that a light having a wavelength around 1,610 nm is generated from the excited erbium ions. Further, the first and the second optical fiber grating 24 and 30 enable the light having the wavelength around 1,610 nm generated from the excited erbium ions to be totally reflected and resonate while interposing the optical fiber 22 therebetween.

While the present disclosure has been illustrated and described in connection with the embodiments, it will be apparent to those skilled in the art that modifications and variations can be made without departing from the spirit and scope of the present disclosure as defined by the appended claims. Accordingly, the exemplary embodiments described herein are merely illustrative and are not intended to limit the scope of the present disclosure. The technical idea of the present disclosure is not limited by the exemplary embodiments. The scope of protection sought by the present disclosure is defined by the appended claims and all equivalents thereof are construed to be within the true scope of the present disclosure.

The invention claimed is:

1. An optical amplifier using an optical fiber, the optical amplifier comprising:
    a single-mode optical fiber in which a plurality of rare earth elements is doped simultaneously;
    first and second optical fiber gratings disposed at opposite sides of the optical fiber, respectively, and totally reflecting light having a wavelength in a specific range;
    a pumping light source configured to generate a pumping light to excite rare earth ions in the optical fiber; and
    an optical coupler connected to the optical fiber and configured to transmit a light signal generated from a light source and the pumping light generated from the pumping light source to the optical fiber,
    wherein
        erbium and thulium are doped in the optical fiber,
        the light signal has a wavelength in a range from 1,800 nm to 2,100 nm, and
        the pumping light has a wavelength in a range from 970 nm to 990 nm.

2. The optical amplifier using the optical fiber of claim 1, wherein a doping ratio of the erbium to the thulium is set in a range from 1 to 2 to 1 to 10.

3. The optical amplifier using the optical fiber of claims 2, wherein a doping concentration of the erbium is set to be 1,000 ppm, and a doping concentration of the thulium is set to be in a range from 2,000 ppm to 10,000 ppm.

4. The optical amplifier using the optical fiber of claim 1, wherein the light totally reflected by the first and the second optical fiber grating has a specific wavelength in a range from 1,550 nm to 1,610 nm.

* * * * *